UNITED STATES PATENT OFFICE.

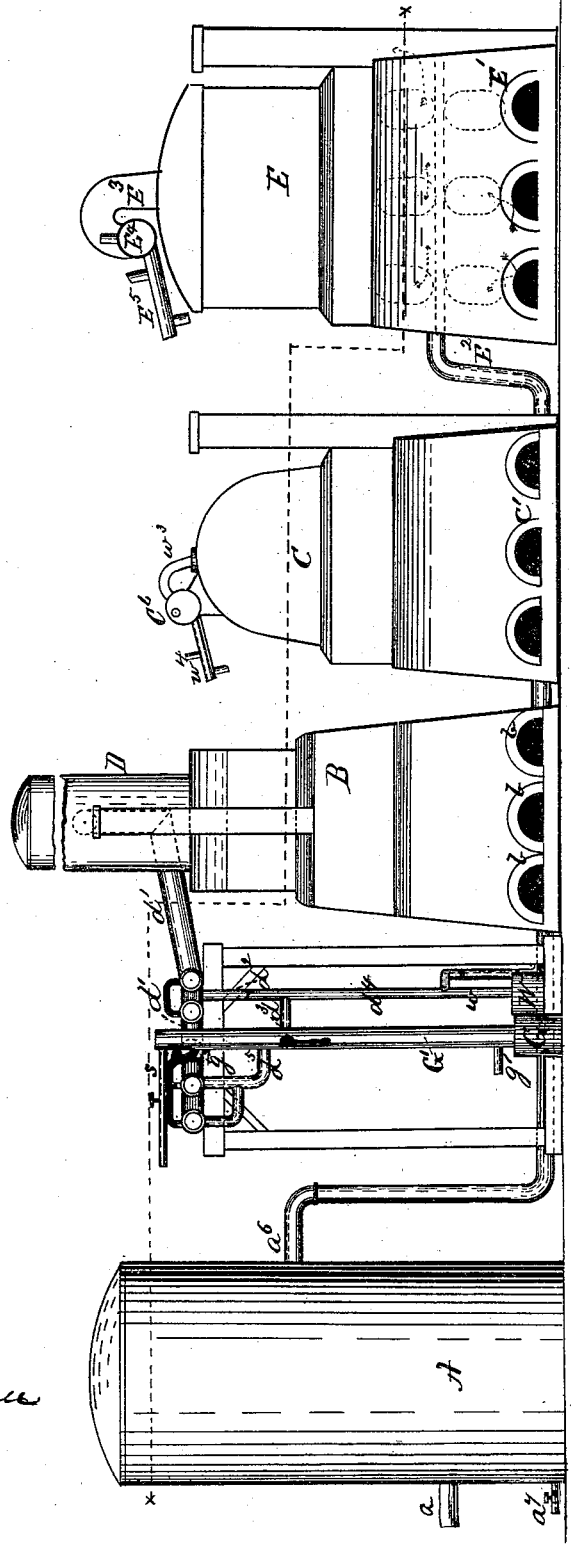

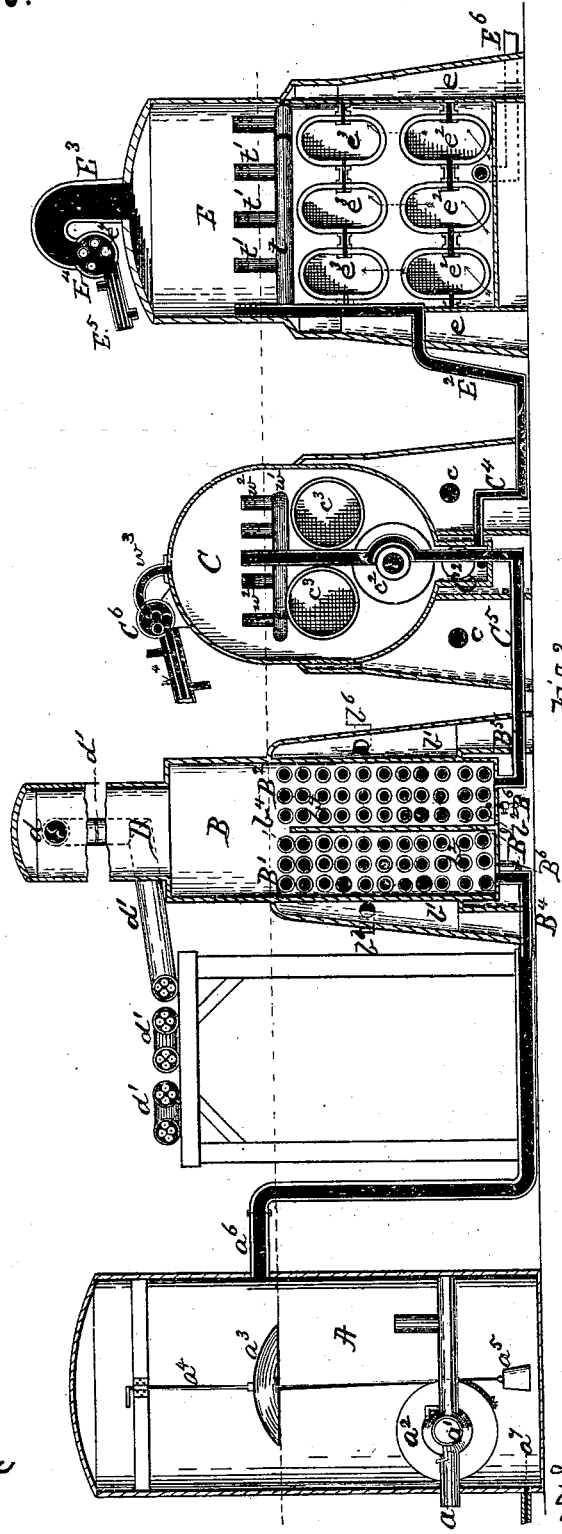

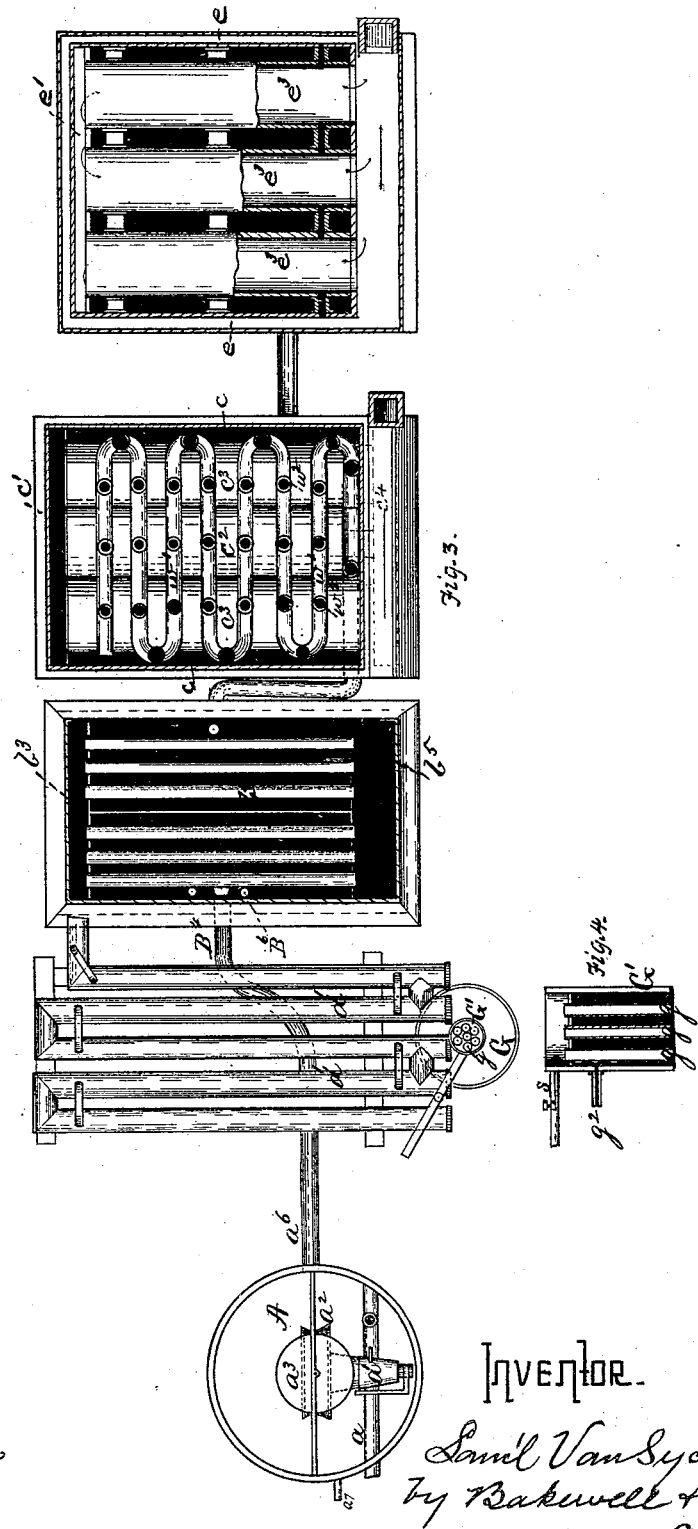

SAMUEL VAN SYCKEL, OF TITUSVILLE, PENNSYLVANIA.

IMPROVEMENT IN CONTINUOUS DISTILLATION AND APPARATUS THEREFOR.

Specification forming part of Letters Patent No. 191,203, dated May 22, 1877; application filed February 12, 1877.

*To all whom it may concern:*

Be it known that I, SAMUEL VAN SYCKEL, of Titusville, in the county of Crawford and State of Pennsylvania, have invented a new and useful Improvement in Continuous Distillation and Apparatus Therefor; and I do hereby declare the following to be a full, clear, and exact description thereof, reference being had to the accompanying drawings, forming part of my specification, in which—

Figure 1 is an elevation of a governor, primary condenser, and series of stills employed in carrying out my invention. Fig. 2 is a longitudinal vertical section of the same. Fig. 3 is a horizontal section of the governor, condenser, and stills. Fig. 4 is a sectional view of a portion of the vertical condenser arranged on the gasoline-tank.

Like letters refer to like parts wherever they occur.

My invention relates especially to the continuous distillation of petroleum-oils, but embraces certain principles in the construction and operation of the apparatus equally applicable to the distillation of spirits or to distillation generally.

In the method of distillation the several points may be stated as follows: First, maintaining a uniform and graduated body of oil in the series of stills, and heating the contents of the still evenly throughout, so that continuous distillation is conducted without variable or excessive temperatures; secondly, in transferring the liquid from still to still in such a manner that the liquid attains the temperature of the succeeding still before it is mingled with the contents of said still, and in delivering the liquid into the receiving-still at a point near the surface of the oil in the still, so that any vapors or gas formed in the transit may escape without disturbing the contents of the receiving-still; and, thirdly, in conducting the distillation in the primary or crude-oil still so as to vaporize so much of its contents as shall bring the oil to the requisite fire-test, and insure the removal of the benzine, gasoline, and light products, those of 80° Baumé and under being condensed and returned to a still separately or together with the crude oil, while the benzine, gasoline, &c., may be condensed, according to gravity, as in fractional distillation.

In the apparatus, the points of construction are as follows: First, the interposition of a governor between the storage-tank or source of supply and the series of stills; secondly, the combination, with the first still in a series arranged for continuous distillation, of a condenser so constructed as to arrest all products of 80° Baumé and under and return the same to the primary still; thirdly, in the combination of a series of stills arranged for continuous distillation, each still of the series being surrounded and traversed by combustion-flues, so as to insure equal distribution of the heat, and the several stills being connected by a series of pipes, branches from which rise through the liquid in the receiving-stills and deliver any gas formed into the vapor-space of the still; also, in details of construction hereinafter specified.

I will now proceed to describe my invention, so that others skilled in the art to which it appertains may apply the same.

In the drawings, A represents a governor or apparatus interposed between the storage-tank or other source of supply and a series of stills, for the purpose of regulating the supply of oil, so as to maintain the oil in the stills at a predetermined height. It consists of a tank or receiver, having an induction or supply pipe, $a$, which connects with the storage-tank, and which may have a stop-cock without the tank for shutting off the supply from the storage-tank.

In that portion of pipe $a$ located within the governor is a stop-cock, $a^1$, having upon its stem a wheel or pulley, $a^2$, connected by a rope, chain, or wire, to a float, $a^3$, which latter is controlled by a rod, $a^4$, moving in guides near the top of the governor-chamber. The rising of this float, as oil enters the governor-chamber, turns the cock $a^1$, closing the supply-pipe, and, in order to reverse the pulley $a^2$ and open the supply-pipe, a weight, $a^5$, is secured to the pulley by a chain or wire, as shown. $a^6$ indicates the exit or discharge pipe, and $a^7$ a pipe for discharging any water which may accumulate. B represents the primary or crude-oil still of the series, at one end of which are arranged grates $b$, or a combustion-chamber, from which one set of flues, $b^1$, pass to the sides of the still, and a second set, $b^2$, traverse the lower part of the still, the two uniting with or delivering into a rear flue, $b^3$, whence the products of combustion escape by return flues $b^4$, which traverse the upper part of the still, and thence, by flue $b^5$, to the usual stack.

It will be seen the flues are so arranged as to apply the heat uniformly and regularly to the oil to be evaporated. In order, however, to control the direction of the products of combustion at pleasure a set of dampers, $b^6$, guard the points of communication between the side and rear flues, so that all or any part of the products may be turned through flues $b^2$. The lower part of still B is divided into two chambers, $B^1$ $B^2$, by a vertical plate or or partition, $B^3$, one of said chambers, $B^1$, being the receiving-chamber, and communicating, by means of pipe $B^4$, with the governor A; the other chamber, $B^2$, connecting, by means of discharge-pipe $B^5$, with the second still C of the series. $B^6$ is a discharge-pipe for drawing off any water which accumulates in the bottom of the still-chamber where the oil first enters.

D is a cylindrical continuation of the dome, which is preferably extended up for twenty or thirty feet, and from which the vapors from the still are conducted off through a series of small pipes, $d$, surrounded by a water-jacket, $d^1$, the pipes $d$ and $d^1$ being arranged in bends, as shown, and constituting a condenser. From the first two or more sections of the condenser discharge-pipes $d^2$ $d^3$ conduct off the condensed matter, which will usually be products of 80° Baumé and under, mixed with water, the pipes $d^2$ $d^3$ uniting to form a pipe, $d^4$, which conducts or returns the product to the receiving-chamber $B^1$ of the still B, the water being trapped off into tank W by means of branch pipe $w$. The condenser is enlarged by the addition of sections as desired, and the light products over 80° Baumé are conducted, by pipes $d^5$ $d^6$, to one or more gasoline-tanks, G, suitably placed.

G indicates a gasoline-tank connected to the condenser by its receiving-pipe $d^5$, and furnished with escape-pipes $g$, for the non-condensable gases, said pipes $g$ being surrounded by a water-jacket, $G^1$. The jacket $G^1$ receives its water-supply at $g^1$, and delivers it, at $g^2$, to the jacket $d^1$, through which it flows toward the still, and is discharged at a point near dome or cylinder D. By this means the cooling-liquid is lowest at the desired point, namely, where the uncondensable gases are escaping. Across the mouth of the escape-pipes $g$ is arranged a steam-jet, $s$, for dissipating the gases or for forcing them into the furnaces through suitable pipes, the latter action being preferable, as thereby the fires in the furnace are kept uniformly burning without additional expense for fuel. If preferred, a pump or fan-blower may be employed instead of the jet $s$.

C represents the second still of the series employed by me, and which is of the usual cylindrical form arranged horizontally. $C^1$ is the furnace or combustion-chamber, separated from the still by a bridge-wall, perforated opposite the center of the still and at the sides, to permit the escape of products of combustion. $c$ are side flues which connect with end flues $c^1$ by openings, which may or may not be provided with dampers; and, in order to facilitate the equal heating of the liquid in the still, a central flue, $c^2$, of cylindrical (or like desirable) form is arranged within the still and connected to the combustion-chamber and rear flue $c^1$ by contracted openings. By such construction of flue $c^2$ the the products of combustion are allowed to expand within the flue, a greater heating-surface is obtained, and the escape of the products of combustion is retarded. The rear or end flue $c^1$ communicates with the discharge-flue $c^4$ by means of return flues $c^3$, which traverse the still at points sufficiently above the drum-flue $c^2$ to leave room for properly cleaning the still.

$C^2$ indicates a tar or sediment drum, secured to or formed on the lowest point of the still, and, if desired, provided with a man-hole and a discharge-pipe, $C^4$, the latter being employed for connecting C with E when more than two stills are employed. $C^5$ is the inlet-pipe for connecting still C with the crude-oil still. It enters the still at or near its lowest point, rises through the liquid in the still, and terminates in a worm, $w^1$, just below the surface. It is provided with perforated branches $w^2$, which permit the vapors formed to escape into the vapor-space of the still, while the oil is discharged at the end of the pipe below the level of the oil in the still.

From the dome of the still a series of short pipes or goose-necks, $w^3$, conduct the vapors into a jacket, $C^6$, through which pass a series of water-tubes, thus forming a condensing-head. The vapors pass from jacket $C^6$ through the series of pipes $w^4$, which lead to the condenser. From still C a discharge or exit pipe, $C^4$, leads to the next still E of the series.

At this point I will state that as continuous distillation is generally conducted, the two stills before described will suffice; but in my process I usually employ a third still.

E represents the third still, which may be a cylindrical still, or square, as shown, is provided with a furnace, $E^1$, a perforated bridge-wall, side flues $e$, rear flue $e^1$, and a series of direct and return flues, $e^2$ $e^3$, which traverse the still, by means of which the oil is divided up and effectually heated. $E^2$ is the induction-pipe, which connects this still with the former still of the series. It rises to a point just below the vapor-space, and terminates in a branch, $t$, provided with perforated vapor-discharge tubes $t'$. $E^3$ indicates the goose-neck, which delivers into drum $E^4$, through which pass the water-pipes $e^4$ supplied from the water-jacket $E^5$ of the condenser pertaining to this still. $E^6$ is the discharge-pipe of still E. This still is constructed and operates upon the same principles as stills C of the series.

The operation of my devices is as follows: The governor A having been properly placed between the supply-tank and the crude oil or primary still, with its discharge-pipe $a^6$ at such an elevation as will maintain the requisite height of oil in the still, the communication between the governor and storage-tank is opened, and the oil rises in the governor-chamber until the rising of the float turns the pulley $a^2$ and closes cock $a^1$, cutting off the supply. The oil passes from the governor through pipe $a^6$ to the chamber $B^1$ of still B, thence over partition $B^3$ until the still has received its charge. As the oil escapes by the discharge-pipe $a^6$ of the governor, the float $a^3$ sinks, and weight $a^5$ reverses pulley $a^2$, opening stop-cock $a^1$, which is again closed by the rising of the float. As the still draws on the oil in the governor the float descends, and by the rise and fall of the float the amount of liquid entering the still is regulated. The furnaces of still B being properly fired, the products of combustion escape by flues $b^1$ $b^2$ $b^3$ $b^4$ $b^5$, the dampers are manipulated to cause more or less of the products to pass through the flues which traverse the still, and the oil in the still, which is divided up by the flues and presented in sheets, is heated on all sides, thus insuring uniform distillation.

It will be observed that no heat is applied to the bottom of the stills. The still B is raised to 300° or 350° Fahrenheit, and a large portion of its contents—say from one-third to one-half—is vaporized, so as to insure the disengaging of non-condensable gases and the driving off of all light products. By such a procedure some of the heavier products will be vaporized; but much of this will be condensed in the high dome D and fall back, while the remainder will be condensed in the first part of the condenser, together with some water and such heavy gasoline and benzine as does not exceed 80° Baumé, and will be returned to the still by tubes $d^2$ $d^3$ $d^4$, the water being trapped out into tank W by pipe $w$. The lighter products, ranging 85°, 90°, and 95° Baumé, are condensed in the distant coils of the condenser, and are received into tank G or separate tanks, according to grade, as preferred, while the non-condensable gases are drawn off by steam-jet or otherwise, and delivered to the furnace or allowed to escape into the air. The distillate of 80° Baumé and under, it will be perceived, is thus returned to that side of the partition in still B which receives the crude oil, and is redistilled with the light products of each quantity of crude oil admitted.

By this method of proceeding I get rid of all non-condensable gases and much light product, which it has heretofore been found impossible to fully separate from the heavier products in the still.

The crude oil which enters still B of about 47° Baumé, is brought to the fire-test, and, escaping into the chamber $B^2$, leaves still B at from 41° to 42° Baumé by pipe $B^5$, is conducted through the body of the oil in still C, and discharged into the same just below the surface, the gases and vapors escaping into the vapor-space of the still through the small branches $w^2$. The oil or liquid in still C has been raised to 400° or 500° Fahrenheit, and the liquid or oil from B gradually reaches the temperature of the oil in this still as it enters through pipe $C^5$, so that when it is discharged any vapor formed escapes at once into the dome of C, while the oil mingles with the oil in the still without reducing its temperature or causing any commotion in the still. Any sediment or tarry matters contained in the oil will sink into chamber $C^2$ below the fire-space and flues, and can be readily drawn off.

In ordinary continuous distillation the oil is finally stilled in the last-named still, the residuum being drawn off to a tar-still for coking, and, if desired, my series may stop here, and the distillation conducted in the usual manner.

But in order to work rapidly and obtain the best results, the temperature of still C is kept at the point above stated, and the contents of the still reduced to 26° or 28° Baumé, (when in the ordinary process the still would become "sick" and require urging,) and is then transferred to still E, the oil in which is at about 600° Fahrenheit, acquiring the temperature of said still, and being delivered from tubes $C^4$ and $E^2$ into the still E, in like manner as specified for still C. In still E the distillation may be conducted in the manner it is usually conducted in the last still of the series, the temperature being raised, lowered, and varied as indicated by the distillate. Each still of the series will, of course, be provided with a suitable condenser, which may be of any approved form.

In describing the process, I have spoken of the oil as transferred from still to still, but it is not intended thereby to indicate an intermittent action, as the oil or other liquid passes continuously and regularly from still to still, the heavier oil in each still sinking to the bottom of its respective still and passing continuously by the exit-pipe to the succeeding still of the series.

The advantages arising from my improved method and apparatus are that the process of distillation is conducted at a moderate and uniform temperature, which insures better results or quality of products and less loss on conversion into tarry matters, and all uncondensable gases are driven off.

In a condenser of the construction shown, viz., a flue-condenser, which consists of a tube of small diameter, and a number of small tubes extending through it from head to head, and provided with water supply and discharge pipes which supply a running current of water through the condenser, great advantage is derived. The old condenser had a still body of water, and it took a long time to condense, but with the small vessel and continuous swiftly-flowing current the vapors are condensed very rapidly.

I do not herein claim the principle of construction, or the specific construction, of stills C and E, the same being the subject-matter of another application of even date herewith; but

Having thus described my invention, what I claim, and desire to secure by Letters Patent, is—

1. The process herein described for distilling hydrocarbon oils, which consists in heating the contents of the still uniformly throughout, and delivering the oil to be distilled into the chamber near the surface of the contained oil, after the incoming oil has acquired the temperature of the body of oil in the still, whereby the body of the oil in the still remains undisturbed, and the distillation may be conducted at low temperatures, substantially as specified.

2. In the continuous distillation of hydrocarbon oils, the process for removing light products and uncondensable gases herein described, which consists in vaporizing from one-third to one-half of the contents of the crude-oil still, and condensing and returning to said still all of the distillate below 80° Baumé, substantially as specified.

3. The combination, with the primary or crude-oil still having the vertical partition, of a series of stills, the whole arranged for continuous distillation, the governor or regulator interposed between the still and the storage or supply tank, whereby only the heavier products pass to the succeeding stills, substantially as and for the purpose specified.

4. In a system of stills arranged for continuous distillation, the combination of two or more stills having heating-flues which surround and traverse the stills, the stills being connected by oil-supply pipes which pass through their lower parts and deliver the vapor into the vapor-spaces and the oil below the surface of the oil of the respective stills, substantially as and for the purpose specified.

5. The combination, with the crude-oil still, of the condenser, the return-pipe, and the water-trap arranged on the return-pipe, substantially as and for the purpose specified.

6. The combination of the condenser, the gasoline-tank and vertical condenser arranged thereon, and the steam-jet, with the primary still, substantially as and for the purpose specified.

7. The still B, provided with induction and delivery pipes, and divided by a vertical partition or diaphragm into receiving and discharging chambers, substantially as and for the purpose specified.

In testimony whereof I, the said SAMUEL VAN SYCKEL, have hereunto set my hand.

SAMUEL VAN SYCKEL.

Witnesses:
JAMES I. KAY,
F. W. RITTER, Jr.